(No Model.)
L. BLATT.
PIPE CONNECTION FOR PNEUMATIC BRAKES.
No. 411,006. Patented Sept. 17, 1889.
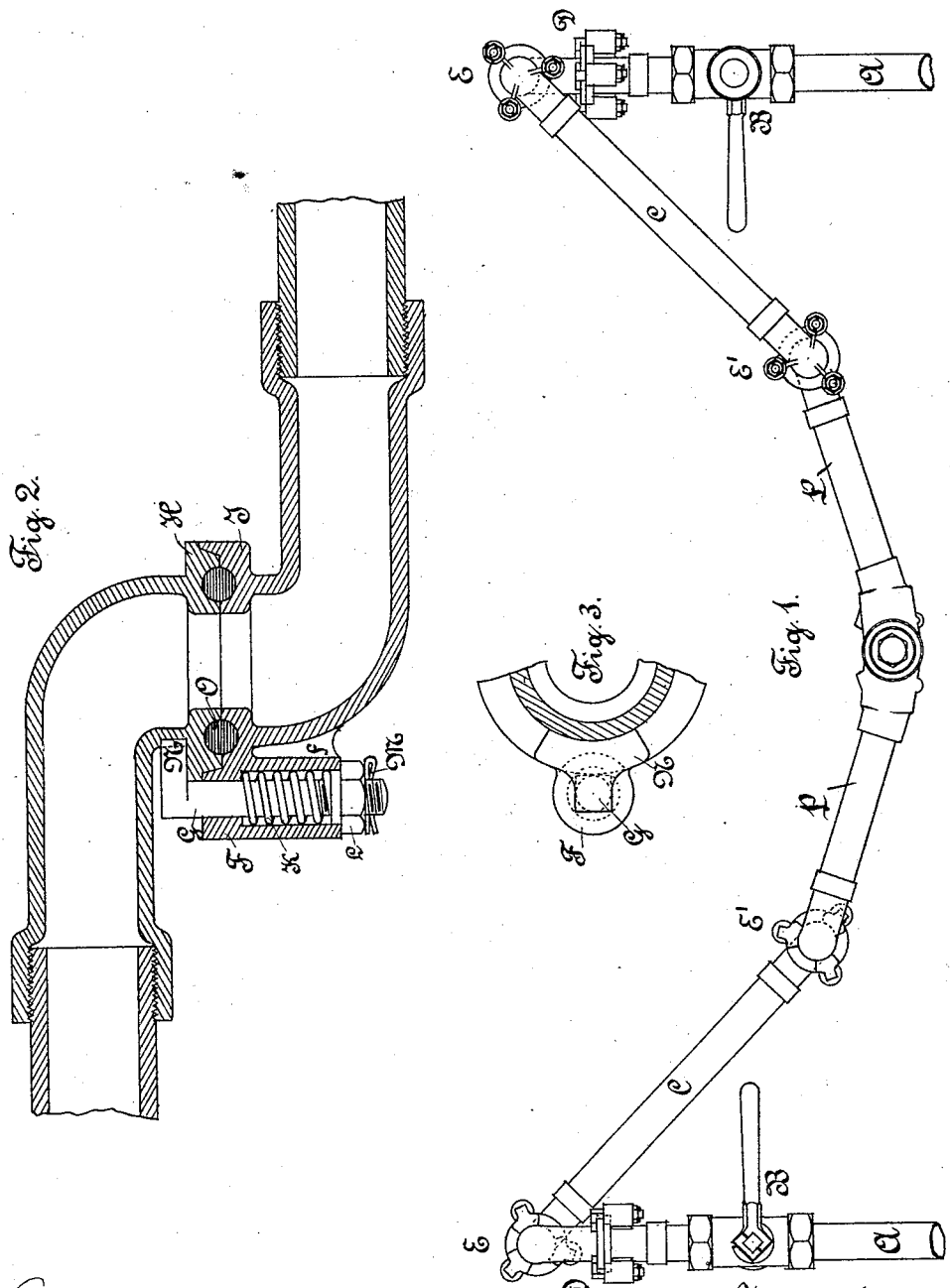
Witnesses
Inventor
Ludwig Blatt

UNITED STATES PATENT OFFICE.

LUDWIG BLATT, OF CANNSTADT, WÜRTEMBERG, GERMANY.

PIPE-CONNECTION FOR PNEUMATIC BRAKES.

SPECIFICATION forming part of Letters Patent No. 411,006, dated September 10, 1889.

Application filed March 26, 1889. Serial No. 304,899. (No model.) Patented in England February 27, 1888, No. 2,934, and in Germany February 29, 1888, No. 44,359.

*To all whom it may concern:*

Be it known that I, LUDWIG BLATT, a subject of the King of Würtemberg, and a resident of Cannstadt, Würtemberg, in Germany, have invented a certain new and useful Improvement in Pipe-Connections for Pneumatic Brakes and the Like, (for which I have obtained Letters Patent in Germany, No. 44,359, dated February 29, 1888, and in England, No. 2,934, dated February 27, 1888,) of which the following is a description such as will enable others skilled in the art to which it appertains to make and use the same.

This invention relates to pneumatic brakes of railway-vehicles; and it consists in an improved construction of pipe connection or union to be placed on the vehicles, such as is hereinafter explained, reference being made to the accompanying drawings, and of which the characteristic features invented are pointed out in the claim.

Figure 1 shows the two parts of the connection in union with one another. Fig. 2 is a sectional view, on a larger scale, of one of the joints. Fig. 3 is a detail view of part of Fig. 2.

Each of the vertical stand-pipes A at each end of the railway-vehicle, provided with cock B, terminates above in a horizontally-revoluble elbow-connection thereto by a joint D. Each said elbow carries a vertically-revoluble length of pipe C, jointed thereto at E. The lengths C are elbowed at the end, to be connected with other vertically-revoluble lengths P by joints E'. The lengths P P are provided at the ends with any suitable unions as at present known for connecting them together. Such pipe-connection admits of horizontal as well as vertical swing.

The construction of the joints D, E, or E' is as follows: As shown in Fig. 2, the pipes are flanged, and the flanges are fitted together, the one being recessed to receive an overlapping rim on the other, so that on the movement of the joint the revolution always takes place about the same axial center. At the same time dust, &c., are prevented as much as possible from penetrating between the surfaces. The opposing surfaces of the flanges H and J are turned out semicircularly, so as to form an annular space with circular cross-section when the flanges are placed together. The cross-section of this annular space may also be of any other suitable shape. Said space is filled up with an india-rubber ring O, of the same cross-section, but of slightly smaller diameter. The ring, owing to its smaller diameter and its elasticity, tends to contract, thus completely tightening the two surfaces of the flanges H and J without thereby impairing the movability of the joint by excessive friction. To one of the flanges—for instance, J—three tubular sockets F are cast at equal intervals, being connected, by means of ribs $f$, with the tube. The sockets F carry in their upper part quadrangular holes for receiving and guiding the bolts G. A spring K is introduced from below into each of the said sockets and rests upon a base therein. This spring presses on the nut L of the bolt G. The hook N of the screw G lies on the upper annular turned surface of the flange H, and surrounds the tube to a certain extent, as shown by Fig. 3. Said hook is pressed down by means of the spring K and nut L. When turning the joint, the under surface of the hook N slides on the upper surface of the flange H, the two flanges H and J being pressed together with more or less power by the springs K and nuts L, the elastic ring O forming a secure packing. The nuts L are secured by pins M against loosening.

I claim—

In pipe-connections for pneumatic brakes and the like, the combination, with two sections of pipe, of flanges H J in the ends thereof, respectively, an annular space between said flanges, a ring O therein, sockets on one of said flanges, hooked bolts G N in said sockets, and springs K, operating on said hooked bolts, substantially as and for the purpose set forth.

In witness whereof I have signed this specification in presence of two witnesses.

LUDWIG BLATT.

Witnesses:
RICHARD HETTLER,
THEODORE ABENHEIM.